UNITED STATES PATENT OFFICE.

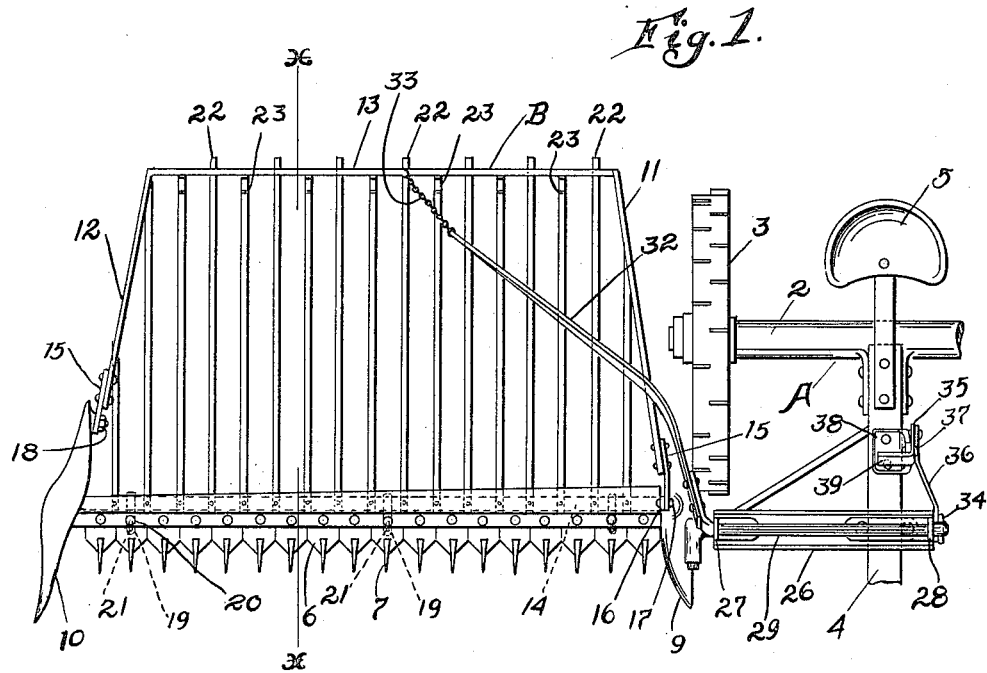

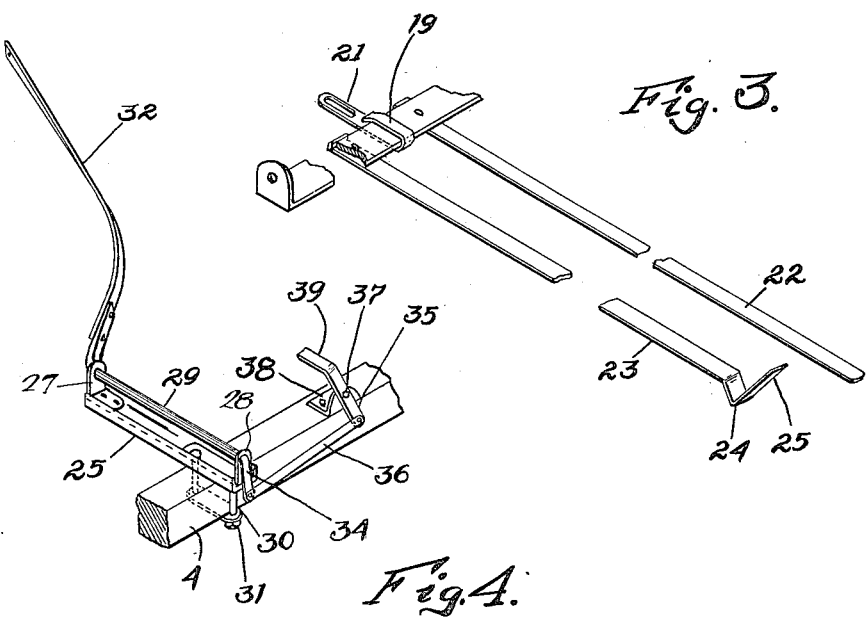

AUGUST H. ECKARDT, OF ST. PAUL, MINNESOTA.

BUNCHING ATTACHMENT FOR MOWING-MACHINES.

1,153,842.

Specification of Letters Patent. Patented Sept. 14, 1915.

Application filed October 20, 1913. Serial No. 796,200.

*To all whom it may concern:*

Be it known that I, AUGUST H. ECKARDT, a citizen of the United States, residing at St. Paul, in the county of Ramsey and State of Minnesota, have invented a new and useful Improvement in Bunching Attachments for Mowing-Machines, of which the following is a specification.

The object of this invention is to provide an attachment for mowers or other cutting machines, upon which grass or other growth is accumulated after it is cut and deposited upon the ground at suitable intervals either in windrows or bunches as desired.

More particularly this invention relates to the details of improvement which are more particularly described in the specification and set forth in the claims following.

This invention is adapted to produce efficient and effective results, its construction being strong and practical for farm use and adapted to operate with substantially no trouble and with a small amount of power and without prematurely dumping the accumulated contents.

In the accompanying drawings forming part of this specification, Figure 1 is a plan of a detail of a mower, showing my invention applied thereto; Fig. 2 is a section taken on the line X—X, Fig. 1; Fig. 3 is a perspective of a detail showing the manner in which the runners are supported, and Fig. 4 is another detail in perspective, showing part of the foot operating mechanism for raising and lowering the accumulating frame.

In the drawings, A indicates a detail of a mower of usual construction, 2 representing part of the frame, 3 one of the wheels, 4 a portion of the pole, 5 the usual seat, 6 the cutters, 7 the finger guards, 8 the cutter bar or guard, 9 the usual shoe and 10 the grass divider, all of which parts are of ordinary construction and adapted to operate in the customary manner.

B indicates a dumping accumulating frame having two longitudinal sides 11 and 12 and a rear end 13, the forward ends of said sides being respectively hinged to a cross bar 14, and to the rear end of the grass divider 10. The method of hinging said accumulating frame is by securing cleats 15 to its ends and by pivotally fastening one of said cleats to an upturned end 16 of the supporting bar 14 by the riveted pin 17 and by fastening the other cleat to the grass divider 10 by means of the bolt 18. This method of hinging allows the rear end of the dumping accumulating frame to swing up and down freely. The supporting bar 14 is secured rigidly to the cutter bar 8 by means of hook shaped straps 19 which are fastened by bolts 20 passing through slotted extensions 21 of said straps and part of the finger guards 7 and into the cutter bar 8.

The cross bar 14 supports a plurality of rearwardly extending runners 22, which are equally spaced apart and lie substantially parallel. Every alternate runner extends below the rear end of the dumping accumulating frame and serves to support it normally when it is in lowered position. The intermediate runners 23 terminate adjacent the inner faces of the dumping accumulating frame and each is formed on its rearward extremity with a down turned loop 24 or shoe and an end or guard 25 slanting rearwardly and extending upwardly above the face of the runner. The bodies of the rearward upwardly extending ends of the intermediate runners lie in a plane slanting upwardly in a rearward direction above the plane in which the runners extending below said frame rest. As a result the upturned ends 25 act as a guard or guards to prevent any hay or material after it is cut and accumulated in the frame B from forcing the frame upward and allowing the accumulated material resting upon the runners from escaping, except when said frame is intentionally operated. The runners are made of flat strips of spring material which tends to normally hold the runners evenly in position, but permits them to sweep freely over inequalities of the ground when in use. It will be noted that the runners extending below the frame B support said frame and prevent the same from catching upon the ground when in use while the intermediate runners are free to perform their function without in any way interfering with the operation of said frame. This method of supporting the frame is a distinct advantage over prior devices as the upturned ends 25 of the spring runners will be forced by the accumulation of material thereon into contact with the inner face of the member 13 of the frame and tend to hold it against accidental raising because it positively stops the frame from operating when not intended to.

The dumping and accumulating frame is raised by the following mechanism, and is adapted to lower by gravity into normal or closed position in which the grass or other growth cut by the mower is accumulated in bunches previous to depositing in windrows. Secured laterally to the pole 4 on its upper side and extending to a considerable length substantially parallel to and toward the cutter is a lateral support 26 in the form of a channel member having secured to its ends brackets 27 and 28 and forming journal supports in which the shaft 29 is freely journaled. Said lateral support is secured to the pole by means of the strap 30 and bolts 31 passing through said support and strap and serving to clamp said support securely upon the pole. The outer end of the shaft 29 is bent laterally and has secured to its end an upwardly and rearwardly extending arm 32, which is coupled to the rear end of the dumping accumulating frame by the flexible connection 33 such as a chain. The opposite end of the shaft 29 is bent down and forms a crank arm 34, the lower end of which is secured to an end of an operating foot lever 35 by means of the connecting rod 36. Said foot lever is fulcrumed at 37 between its ends upon a bracket 38 secured to the pole 4, and has its upper end offset to form a foot piece 39 by which said lever can be tilted, the shaft 29 rocked and the arm 32 swung upwardly and the dumping accumulating frame raised and the contents thereof deposited upon the ground behind the runners. The laterally extending support 26 forms a rigid journal bearing support for the rocker shaft 29, its method of construction being adapted to prevent the rocker shaft from bending or breaking owing to the necessity of supporting it far out from the pole 4 toward a longitudinal center line passing through the dumping accumulating frame.

In operation the accumulating frame B rests upon the ends of the long runners 22 and coöperating with all of said runners receives the grass or other cut material from the cutter or sickle and holds it until the desired quantity accumulates. The guards 25 serve in the mean time to prevent the cut product from forcing the frame into open position and depositing the product prematurely. When it is desired to raise the frame and deposit the product off of the runners, the foot piece 39 is pressed down, thus causing the rocker shaft 29 to turn and the arm 32 to swing up raising the frame into superior position. When the foot piece 39 is disengaged by the foot, the frame B lowers quickly by gravity into normal position in readiness to receive another accumulation of the cut product.

In accordance with the patent statutes, I have described the principles of operation of my invention together with the apparatus which I now consider to represent the best embodiment thereof but I desire to have it understood that the construction shown is only illustrative and that the invention can be carried out by other means and applied to uses other than those above set forth within the scope of the following claims.

Having described my invention what I claim as new and desire to protect by Letters Patent is:—

1. A machine for accumulating and dumping grass or other growth back of a cutting machine, comprising, in combination with said machine and its cutting mechanism of a plurality of freely supported runners extending rearwardly back of said cutting mechanism, an accumulating frame hinged back of said cutting mechanism with its rear end resting upon the runners and adapted to swing upwardly, means for raising said frame for the delivery of accumulated cut material from the runners, part of said runners terminating free of said frame and being formed with downwardly turned shoes upon their free ends adapted to ride upon the ground and with upwardly extending guards extending rearwardly toward said frame and adapted to be forced by the accumulation of material on said runners into contact with the inner face of said frame to lock it against accidental raising.

2. Apparatus for catching and depositing an accumulation of grass or other growth back of a mower, comprising, in combination with said mower and its cutter, of a plurality of runners secured back of said cutter, an accumulating frame hinged back of said cutter with its rear end adapted to swing upwardly, and means for raising said frame for the delivery of cut material from said runners, said frame being supported in accumulating position by the rearward ends of the runners and part of said runners terminating free of said frame and being formed with upwardly extending guards adapted to hold said accumulation and to lock said frame against accidental raising.

3. The combination with the cutting mechanism of a mowing machine having an accumulating frame pivotally connected therewith and extending back from said cutting mechanism, of a number of freely supported spring runners adapted to tensionally engage said accumulating frame to prevent its accidental raising, and means for elevating said frame, as and for the purpose specified.

4. An apparatus of the type described comprising, in combination, a mower and its cutter, of a plurality of runners secured back of said cutter, an accumulating frame hinged back of said cutter above said runners and adapted to swing upwardly, means for raising said frame for the delivery of cut material from said runners, and means secured to said cutter and adapted to contact with and lock said frame against accidental raising.

In testimony whereof, I have signed my name to this specification, in the presence of two subscribing witnesses.

AUGUST H. ECKARDT.

Witnesses:
S. L. WASCHENBERGER,
F. G. BRADBURY.

Copies of this patent may be obtained for five cents each, by addressing the "Commissioner of Patents, Washington, D. C."